United States Patent
Paintner et al.

(10) Patent No.: US 12,495,948 B2
(45) Date of Patent: Dec. 16, 2025

(54) SYSTEM WITH A DISHWASHER, METHOD, AND COMPUTER PROGRAM PRODUCT

(71) Applicant: BSH Hausgeräte GmbH, Munich (DE)

(72) Inventors: Kai Paintner, Welden (DE); Michael Rupp, Holzheim (DE); Kuldeep Narayan Singh, Dillingen a.d. Donau (DE)

(73) Assignee: BSH Hausgeräte GmbH, Munich (DE)

( * ) Notice: Subject to any disclaimer, the term of this patent is extended or adjusted under 35 U.S.C. 154(b) by 286 days.

(21) Appl. No.: 18/265,704

(22) PCT Filed: Jan. 13, 2022

(86) PCT No.: PCT/EP2022/050623
§ 371 (c)(1),
(2) Date: Jun. 7, 2023

(87) PCT Pub. No.: WO2022/161778
PCT Pub. Date: Aug. 4, 2022

(65) Prior Publication Data
US 2024/0041296 A1    Feb. 8, 2024

(30) Foreign Application Priority Data
Jan. 27, 2021 (DE) .......................... 102021200715.5

(51) Int. Cl.
A47L 15/42    (2006.01)
G06T 7/11    (2017.01)
G06V 10/141    (2022.01)

(52) U.S. Cl.
CPC ............ *A47L 15/4295* (2013.01); *G06T 7/11* (2017.01); *G06V 10/141* (2022.01); *A47L 2401/04* (2013.01)

(58) Field of Classification Search
None
See application file for complete search history.

(56) References Cited

U.S. PATENT DOCUMENTS

| | | | |
|---|---|---|---|
| 10,809,685 B2 | 10/2020 | Fawaz | |
| 11,439,292 B2 * | 9/2022 | Ha | ....... A47L 15/0097 |
| 2010/0294311 A1 | 11/2010 | Classen | |
| 2019/0380559 A1 * | 12/2019 | Lee | ....... A47L 15/4295 |
| 2022/0273158 A1 | 9/2022 | Disch | |

OTHER PUBLICATIONS

National Search Report DE 10 2021 200 715.5 dated Nov. 9, 2021.
International Search Report PCT/EP2022/050623 dated Apr. 13, 2022.

* cited by examiner

*Primary Examiner* — Rita P Adhlakha
(74) *Attorney, Agent, or Firm* — Michael E. Tschupp; Andre Pallapies; Brandon G. Braun

(57) ABSTRACT

A system includes a dishwasher having a dish rack to receive dishes. An image capturing device captures a 2D image of the dish rack of the dishwasher and the dishes, and an image processing device determines a 3D image based on the captured 2D image and additionally captured metadata of the captured 2D image. A control device executes a wash program as a function of the determined 3D image.

18 Claims, 6 Drawing Sheets

SYSTEM WITH A DISHWASHER, METHOD, AND COMPUTER PROGRAM PRODUCT

CROSS-REFERENCES TO RELATED APPLICATIONS

This application is the U.S. National Stage of International Application No. PCT/EP2022/050623, filed Jan. 13, 2022, which designated the United States and has been published as International Publication No. WO 2022/161778 A1 and which claims the priority of German Patent Application, Serial No. 10 2021 200 715.5, filed Jan. 27, 2021, pursuant to 35 U.S.C. 119(a)-(d).

The contents of International Application No. PCT/EP2022/050623 and German Patent Application, Serial No. 10 2021 200 715.5 are incorporated herein by reference in their entireties as if fully set forth herein.

BACKGROUND OF THE INVENTION

The present invention relates to a system with a dishwasher, a method for operating a dishwasher and a computer program product.

Dishwashers featuring a camera or the like for capturing an image of a dish rack are known. For example the load in the dishwasher, the soiling of the dishes and the like can be determined on the basis of captured images. Such information can be used to optimize a wash program, allowing the cleaning result to be improved.

BRIEF SUMMARY OF THE INVENTION

It is therefore an object of the present invention to improve the cleaning of dishes in a dishwasher.

According to a first aspect a system is proposed with a dishwasher, in particular a household dishwasher. The dishwasher comprises an image capturing device for capturing a 2D image of a dish rack of the dishwasher and dishes arranged therein. The system comprises an image processing device for determining a 3D image of the dish rack on the basis of the captured 2D image and additionally captured metadata of the captured 2D image. The dishwasher also comprises a control device for executing a wash program as a function of the determined 3D image.

This system has the advantage that a three-dimensional image of the dish rack is available, with only one image recording device being required for the purpose. The three-dimensional image allows a range of useful information to be determined for the execution of the wash program. For example it can be determined on the basis of the 3D image whether a dish is sticking out of the dish rack and may block a spray device, such as a rotatably supported spray arm, and corresponding measures can be implemented. An intensive wash zone can also be activated or deactivated automatically. A user can also be helped to determine an optimal load when loading the dishwasher with dishes. A drying step can also be optimized.

The image capturing device is for example a digital camera, which is designed to capture and output a digital image with a resolution, for example, of at least 1 MP (MP=megapixel), preferably at least 5 MP, more preferably higher than 8 MP. The image capturing device preferably comprises an image sensor with an extended spectral range, having a sensitivity within the range from 2500 nm-250 nm for example. The image capturing device preferably also comprises a lens, which is designed to map the dish rack (or dish racks, if the dishwasher has multiple dish racks) onto the image sensor. The image capturing device preferably captures the image of the dish rack when said dish rack is arranged in a predetermined position. The image capturing device can also comprise a lighting unit to illuminate the dish rack as the image is being captured.

In particular the dishwasher has just one image capturing device with one optical beam path and one sensor. In particular it is therefore not a stereo camera. This minimizes the complexity of the dishwasher.

In some embodiments the image capturing device can be configured as a stereo camera, which captures two 2D images from different angles and can determine the 3D image based on these.

For example the dishwasher comprises a wash container with a wash container flange running round the loading opening of the wash container, the image capturing device being arranged in or on an upper flange segment of the wash container flange assigned to the top of the wash container and the image capturing device facing away from the wash container at an angle to a plane spanned by a base of the wash container.

This arrangement of the image capturing device is advantageous as it is thus arranged away from a region that can be accessed by wash liquor, allowing ambient conditions to be easily monitored even for sensitive electronic parts. The wash container flange is preferably located away from a wash chamber sealed by means of a sealing device.

A hollow space for example is provided in or on the wash container flange, with at least part of the image capturing device being held therein, said hollow space being delimited by a transparent element preferably in the direction of the plane.

This embodiment ensures that the image capturing device is arranged on the dishwasher in such a manner that it does not project or be perceived as problematic. A dishwasher featuring the wash container flange with the hollow space but not equipped with an image capturing facility can also be retrofitted relatively easily.

The transparent element is configured for example as a plastic disk, a mineral glass disk, a glass disk or the like. The transparent element preferably seals the bottom of the hollow space, in the direction of the plane, so that steam from the wash chamber cannot enter the hollow space when the door is opened at the end of a wash program. A corresponding sealing device for example is provided for this purpose. The transparent element is preferably transparent for the entire spectral range captured by the image capturing device. In some embodiments provision can however be made for the transparent element only to be selectively transparent for specific parts of the spectral range. The transparent element then also acts as a filter.

In some embodiments the image capturing device is arranged in its entirety in the hollow space, the hollow space being sealed as a whole. In other words no moisture in particular can enter the hollow space, which is advantageous for the service life of the image capturing device.

The image capturing device preferably has a vertical image angle of at least 90° and a horizontal image angle of at least 120°.

This ensures that the entire dish rack is captured and individual regions, for example edge regions, of the dish rack are also visible on the captured image. The respective image angle is preferably delivered by corresponding optical elements. It is also possible to refer to an ultra-wide angle optical system.

The image processing device can be implemented by means of hardware and/or software. In the case of a hardware implementation the image processing device can be configured for example as a computer or microprocessor. In the case of a software implementation the image processing device can be configured as a computer program product, a function, a routine, a part of a program code or an executable object.

The image processing device preferably comprises a neural network, which is designed to generate the 3D image. The image processing device can have multiple neural networks, each of which can execute a sub-step for the determination of the 3D image. The image processing device preferably comprises a processor and a storage device and is designed to execute image transformations on the captured 2D image using algorithms, functions and the like.

The structure of a neural network is as follows. The neural network can be divided into three layers or sections, an input layer, one or more hidden layers and an output layer. Each of the layers comprises a plurality of individual neurons, it being possible for different layers also to have a different number of neurons. The number of neurons in the input layer depends for example on the quantity and format of the data to be processed by the neural network, which can also be referred to as the dimensionality of the data. The number of neurons in the output layer depends for example on the dimensionality of the output vector.

The input layer forms the entrance to the neural network, to which the data to be processed is fed in the form of an input vector. The neurons of the input layer receive the information contained in the input vector and forward them weighted to the neurons of the first hidden layer. The neurons of the first hidden layer receive the weighted signals from the input layer and forward these, also weighted, to the following hidden layer. The signals are passed in this manner from layer to layer through the neural network, until the output layer is reached. There can also be shortcuts from neurons of different non-consecutive layers and/or counter to the main propagation direction. The output vector is derived from the neurons of the output layer. The number of hidden layers is essentially unlimited but the computing power required to operate the neural network is scaled to the number of hidden layers. The more layers there are in a neural network, the more complex the tasks the neural network can execute but the training expenditure, in other words the size of the training dataset, also increases correspondingly. It is therefore advantageous only to use the number of hidden layers necessary for the respective task.

The metadata captured for a respective captured 2D image comprises for example a range of information relating to the current operating state of the dishwasher, such as a pull-out state of a dish rack, an opening angle of a door of the dishwasher and the like, as well as operating parameters or settings of the image capturing device at the time the image is captured, for example illumination time, sensitivity, image angle and the like. The metadata therefore comprises information that is useful when determining the 3D image, in particular in order to avoid misinterpretation.

A neural network must be trained before it can be used. Various training methods can be used. A distinction can be made between supervised learning and unsupervised learning. With supervised learning an input vector is supplied to the neural network with the corresponding optimal output vector also being predefined. The neural network is optimized on the basis of the difference between the output vector generated by the neural network and the optimal output vector. The weightings to which the individual neurons are linked are adjusted for this purpose. With unsupervised learning the optimal output vector is not predetermined but an optimization function for example is evaluated and the neural network optimized accordingly. One form of unsupervised learning is known as GAN (generative adversarial network), The determined 3D image can also be referred to as a 3D model of the dish rack. The 3D image comprises depth information, which is not contained in the 2D image. The execution of the wash program can be optimized on the basis of the depth information. Optimization of the execution of the wash program comprises in particular outputting an instruction to the user of the dishwasher to signal a sub-optimal arrangement of dishes to them, so said user can for example optimize the arrangement. This can be done for example under instruction from the dishwasher. Parameters relating to the application of wash liquor to the dishes by means of one or more hydraulic systems can in particular also be optimized. A higher pressure can be used for deeper pots or glasses for example to clean to the bottom of such items.

According to one embodiment of the system the image processing device comprises a first neural network, which is designed to generate a latent vector as a function of the captured 2D image and the metadata of the captured 2D image, and a second neural network, which is designed to determine a 3D image of the dish rack as a function of the generated latent vector.

The first neural network determines a latent vector on the basis of the captured 2D image and the captured metadata. The latent vector therefore forms the output vector of the first neural network. The latent vector can be understood as coding of the information contained in the captured 2D image and the metadata. In particular the latent vector comprises a significantly reduced quantity of data compared with the captured 2D image and the metadata.

The first neural network is configured in particular as a CNN (convolutional neural network).

The second neural network determines a 3D image of the dish rack on the basis of the latent vector. The second neural network is configured in particular as a GAN, which has been trained using a corresponding training method.

Corresponding training data must be available for training a respective neural network. For example a large number of 2D images with corresponding metadata and the latent vectors to be generated therefrom must be predetermined. Also the 3D images associated with the latent vectors must be known. The size of the training dataset is preferably at least one hundred, preferably several hundred, more preferably at least one thousand, preferably several thousand sets, each set comprising a 2D image with metadata, the corresponding latent vector and the corresponding 3D image.

According to a further embodiment of the system the latent vector comprises a representation of the image data contained in the captured 2D image and the metadata, the quantity of data in the latent vector being maximum 1/100, preferably maximum 1/500, particularly preferably maximum 1/1000, more particularly preferably maximum 1/10, 000 of a quantity of data in the captured 2D image.

This embodiment allows fast generation of the 3D image on the basis of the latent vector, as comparatively little data has to be processed by the second neural network to generate the 3D image.

According to a further embodiment of the system the metadata of the captured 2D image comprises information relating to the dish rack that is visible on the captured image and/or a segment of the dish rack that is visible on the captured 2D image.

The dishwasher in particular comprises multiple dish racks, such as a lower and upper dish rack.

The information can be determined for example on the basis of an optical label on the dish rack, which can be identified on the 2D image, using a corresponding algorithm. Alternatively or additionally the dishwasher can have a separate sensor, which is designed to capture said information and output it as metadata for the captured image.

According to a further embodiment of the system the metadata of the captured 2D image comprises information relating to a height setting of the dish rack at the time when the 2D image is captured.

The dishwasher can comprise a dish rack of adjustable height. This allows the dish rack to be adjusted in particular to hold dishes of different sizes. As the distance from the image capturing device to the dish rack represents useful information when determining the 3D image, the current height setting of the dish rack is preferably captured as metadata for the 2D image. For example the dishwasher has a corresponding sensor, which is designed to capture the height setting of the dish rack. The sensor can be configured as an image processing unit.

According to a further embodiment of the system the metadata of the captured 2D image comprises information relating to an angle between the image capturing device and the dish rack.

According to a further embodiment of the system the dishwasher comprises a lighting device for illuminating the dish rack and the metadata of the 2D image comprises information relating to an operating mode of the lighting device at the time when the 2D image is captured.

The lighting device assists the capture of the 2D image so that a signal to noise ratio of the image in particular is better than a predetermined minimum value. The lighting device can emit a narrow-band spectrum or a broad-band spectrum. The lighting device can in particular have an intensity in a spectral range outside the visible spectral range.

The lighting device can be arranged with a parallax relative to the image capturing device in relation to the dish rack, so that the image capturing device captures illuminated regions of the dish rack as well as those shaded by dishes. Information relating to the three-dimensional shape of the dishes and the dish rack can be derived based on the shadow thrown here.

The metadata in particular comprises information relating to a lighting intensity, a lighting spectrum, a parallax between the lighting device and the image capturing device.

According to a further embodiment of the system the dishwasher comprises multiple lighting devices arranged spatially separated from one another to illuminate the dish rack and the metadata of the 2D image comprises information relating to a respective operating mode of the multiple lighting devices at the time when the 2D image is captured.

Different illumination states can advantageously be achieved with this embodiment, a respective illumination state supplying additional information for determining the 3D image. Determination of the 3D image can therefore advantageously take place with increased accuracy and reliability.

According to a further embodiment of the system the image capturing device is designed to capture multiple 2D images of the dish rack with the multiple lighting devices in different operating modes, the respective metadata of the multiple 2D images comprising information relating to the respective operating mode of the multiple lighting devices at the time when the respective 2D image is captured and with the image processing device being designed to determine a 3D image as a function of the multiple 2D images and the respective metadata.

In some embodiments the first neural network is designed to generate just one latent vector as a function of the multiple captured 2D images and the respective metadata or the first neural network is designed to generate a latent vector for each of the multiple captured 2D images, the second neural network being designed to determine a 3D image of the dish rack as a function of the multiple generated latent vectors.

According to a further embodiment of the system the control device is designed to determine any blocking of a movably supported spray device of the dishwasher by dishes arranged in the dish rack as a function of the determined 3D image of the dish rack and to execute the wash program as a function of the determined block.

An instruction is preferably output to a user of the dishwasher so that the user can eliminate the block by removing the dishes blocking the spray device.

According to a further embodiment of the system the control device is designed to determine a mass of the dishes arranged in the dish rack as a function of the determined 3D image of the dish rack and to execute the wash program as a function of the determined mass.

The mass of dishes in particular affects the drying of the dishes and can therefore be taken into account when determining the optimal parameters for the drying step. The material of the dishes can also be taken into account here, it being possible also to determine this for example from the 2D image.

In some embodiments of the system the control device is designed to determine a liquid collection point of the dishes arranged in the dish rack as a function of the determined 3D image of the dish rack and to execute the wash program as a function of the determined liquid collection point.

The liquid collection point is in particular a depression in a dish, where liquid collects and is unable to flow away. An instruction is output to the user for example so that said user arranges the item differently so the depression is not present. Drying parameters can also be adjusted so the liquid in the depression can also dry up.

According to a further embodiment of the system the dishwasher has a hydraulic system, which comprises at least one intensive wash zone, the control device being designed to activate the at least one intensive wash zone as required as a function of the determined 3D image of the dish rack.

The intensive wash zone is coupled for flow purposes to the hydraulic system for example by means of a switchable valve, the control device opening the switchable valve to activate the intensive wash zone. The intensive wash zone can also be configured by means of a spray device that can be positioned and/or oriented by motor, the control device configuring the intensive wash zone on the basis of the 3D image so that dishes requiring intensive treatment, for example pots or pans, are located in the intensive wash zone.

According to a further embodiment of the system the system comprises a device that is external to the dishwasher and integrates the image processing device, in particular integrates the first neural network and/or the second neural network, the dishwasher having a communication unit, which is designed to transmit the captured 2D image and the metadata to the external device and to receive the 3D image of the dish rack from the external device.

The external device is preferably configured as a server or the like, with a high level of computing power. The 3D image can therefore be determined with complex algorithms and/or using complex neural networks.

The communication unit can be coupled to the external device for example by means of a network. The network here comprises in particular a mobile radio network, a WLAN, the internet and/or a further wireless or wired data network.

In some embodiments the external device only comprises for example the first neural network and/or the second neural network, the other respective neural network being integrated in particular in the dishwasher. In this embodiment the image processing device is therefore arranged in a distributed manner. The communication unit is designed accordingly to receive the latent vector and/or to send the latent vector.

According to a second aspect a method for operating a dishwasher, in particular a household dishwasher, is proposed. The method comprises the steps:

Capturing a 2D image of a dish rack of the dishwasher and dishes arranged therein and metadata of the captured 2D image.

Determining a 3D image of the dish rack on the basis of the captured 2D image and the captured metadata, and Executing a wash program as a function of the determined 3D image.

The method has the same advantages as those set out for the system according to the first aspect. The method is preferably executed with the dishwasher of the system according to the first aspect.

The embodiments and features described for the proposed system apply accordingly to the proposed method.

A computer program product is also proposed, which comprises commands, which during the execution of the program by a computer prompt said computer to execute the method described above.

A computer program product, for example a computer program means, can be provided or supplied for example as a storage medium, for example a memory card, USB stick, CD-ROM, DVD or in the form of a file that can be downloaded from a server in a network. This can be done for example in a wireless communication network by transferring a corresponding file containing the computer program product or computer program means.

Further possible implementations of the invention comprise combinations of features or embodiments described above or in the following with regard to the exemplary embodiments even if these are not cited specifically. The person skilled in the art will also add individual aspects to improve or complete the respective basic form of the invention.

BRIEF DESCRIPTION OF THE DRAWINGS

Further advantageous configurations and aspects of the invention are set out in the subclaims and the exemplary embodiments of the invention described in the following. The invention is also described in more detail based on preferred embodiments with reference to the accompanying figures.

DETAILED DESCRIPTION OF EXEMPLARY EMBODIMENTS OF THE PRESENT INVENTION

Figure 1:
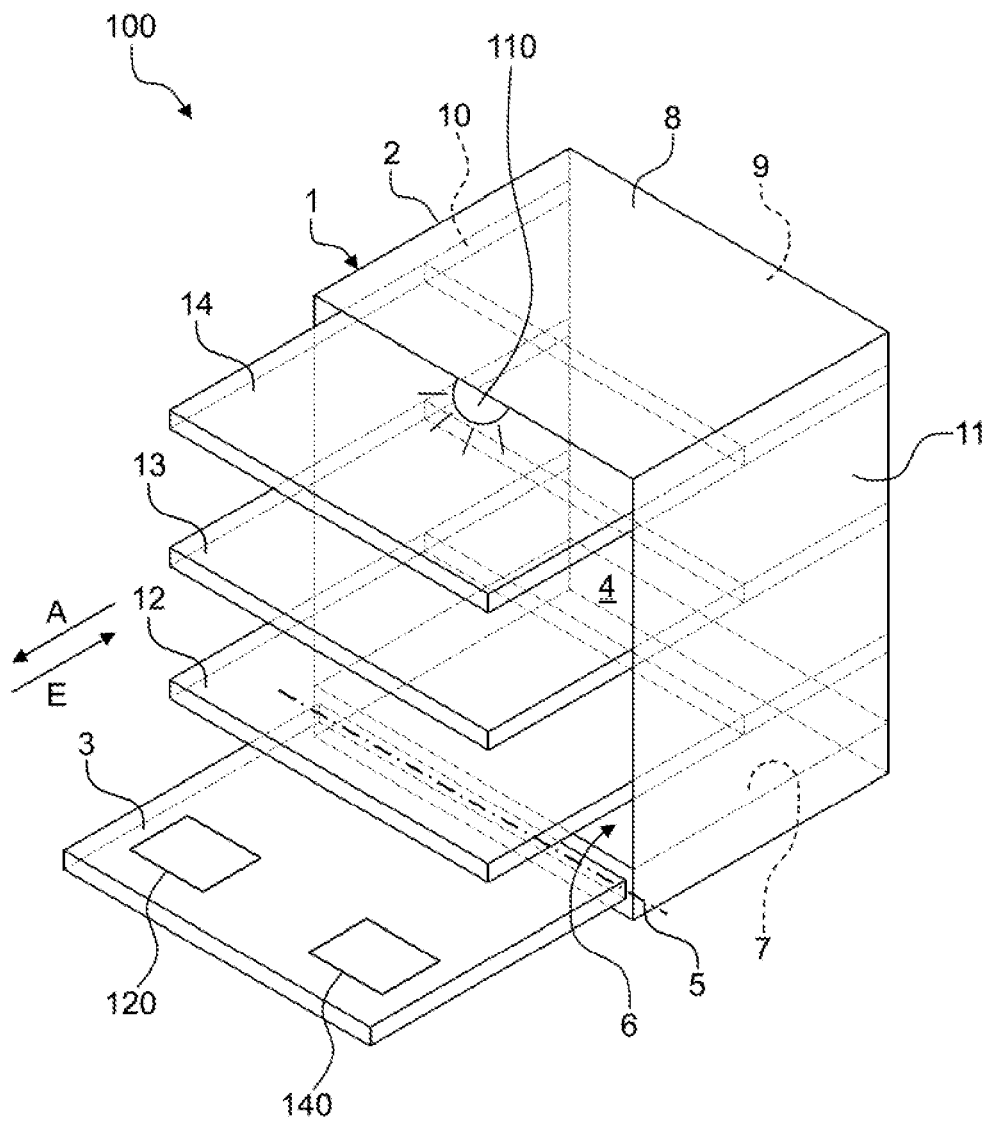
FIG. 1 shows a schematic perspective view of an embodiment of a household dishwasher.

Identical elements or those of identical function are shown with the same reference characters in the figures, unless otherwise specified.

FIG. 1 shows a schematic perspective view of an embodiment of a household dishwasher 1. The household dishwasher 1 comprises a wash container 2, which can be closed, in particular in a watertight manner, by a door 3. A sealing device can be provided between the door 3 and the wash container 2 for this purpose. The wash container 2 is preferably cuboidal. The wash container 2 can be arranged in a housing of the household dishwasher 1. The wash container 2 and the door 3 can form a wash chamber 4 for washing dishes.

The door 3 is shown in its opened position in FIG. 1. The door 3 can be closed or opened by pivoting about a pivot axis 5 provided at a lower end of the door 3. A loading opening 6 of the wash container 2 can be closed or opened with the aid of the door 3. The wash container 2 has a base 7, a top 8 arranged opposite the base 7, a rear wall 9 arranged opposite the closed door 3 and two opposing side walls 10, 11. The base 7, top 8, rear wall 9 and side walls 10, 11 can be made of stainless steel for example. Alternatively the base 7 for example can be made of a plastic material.

The household dishwasher 1 also has at least one dish rack 12 to 14. Multiple, for example three, dish racks 12 to 14 can preferably be provided, the dish rack 12 being a lower dish rack or bottom rack, the dish rack 13 being an upper dish rack or top rack and the dish rack 14 being a flatware drawer. As also shown in FIG. 1, the dish racks 12 to 14 are arranged one above the other in the wash container 2. Each dish rack 12 to 14 can be displaced into or out of the wash container 2 as required. In particular each dish rack 12 to 14 can be pushed or moved into the wash container 2 in an insertion direction E and be pulled or moved out of the wash container 2 in a pull-out direction A counter to the insertion direction E.

Arranged in an upper region of a wash container flange running round the loading opening 6 of the wash container 2 is an image capturing device 110. The image capturing device 110 is configured as a digital camera. The digital camera 110 is positioned in particular centrally in relation to the loading opening 6 and has for example a wide-angle lens (not shown), which allows each of the dish racks 12-14 to be captured in its entirety in a respective 2D image 2DIMG (see FIG. 2, 4 or 6) when moved out.

An image processing device 120 and a control device 140 are also arranged on the door 3. These are shown separately here but they can be integrated together in one element. The arrangement on the door 3 is also only an example. The image processing device 120 is designed to determine a 3D image 3DIMG of a respective dish rack 12-14 (see FIG. 2, 5 or 6) on the basis of the captured 2D image 2DIMG and additionally captured metadata META (see FIG. 2 or 6) of the captured 2D image 2DIMG. This is described in more detail below with reference to FIG. 2-6. The control device 140 is designed to execute a wash program as a function of the determined 3D image 3DIMG.

Figure 2:
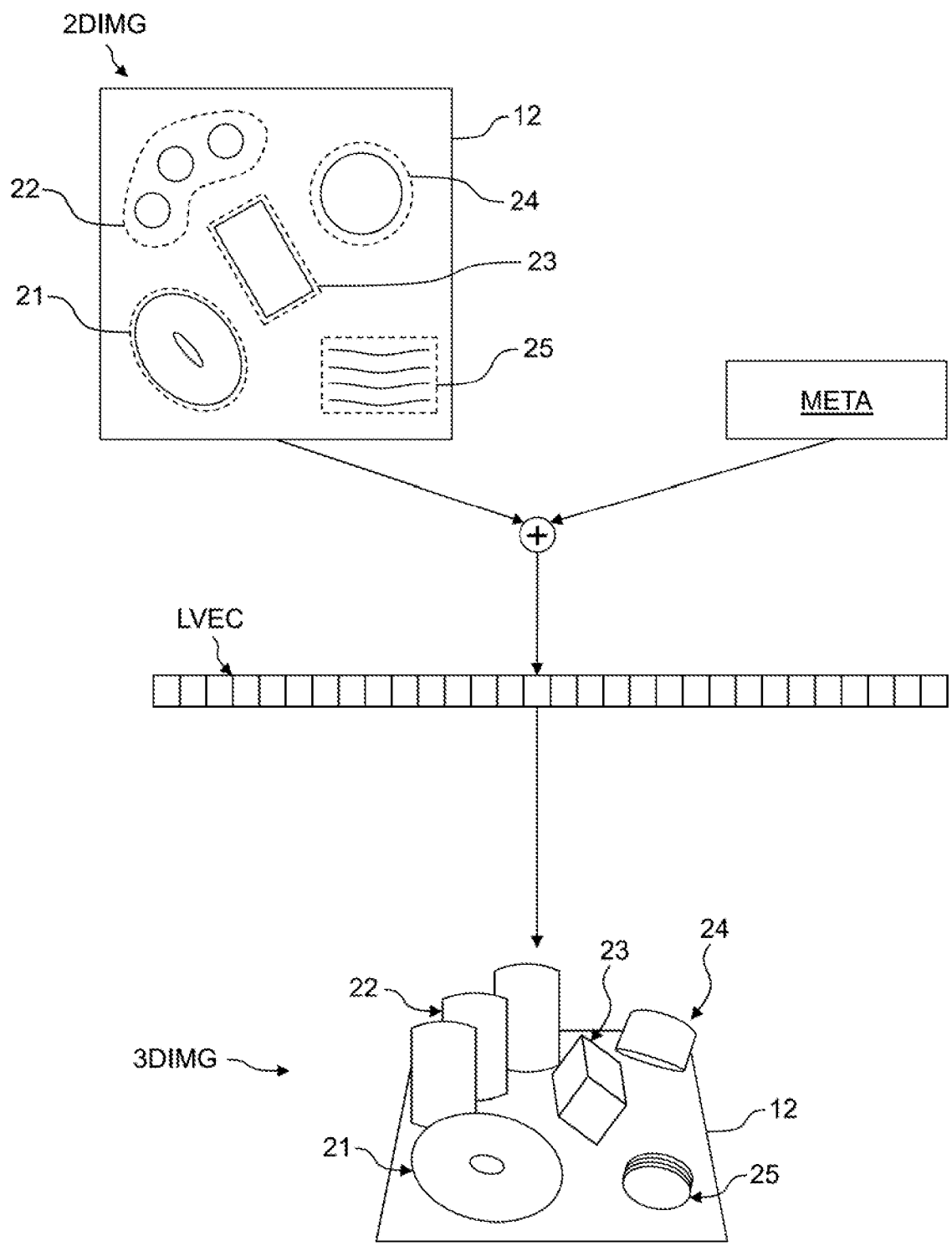
FIG. 2 shows a schematic diagram of an exemplary embodiment for determining a 3D image on the basis of a 2D image and metadata.

FIG. 2 shows a schematic diagram of an exemplary embodiment for determining a 3D image 3DIMG on the basis of a 2D image 2DIMG and metadata META, said example having two separate steps. The 2D image 2DIMG shows a dish rack 12 with dishes 21-25 arranged therein. The 2D image 2DIMG was captured for example by the image capturing device 110 (see FIG. 1), when the dish rack 12 had been moved completely out of the wash container 4. The metadata META comprises for example the information that at the time the image was captured the dish rack 12 had been moved completely out of the wash container 4. The metadata META also preferably comprises the information which of multiple dish racks 12-14 is visible on the 2D image 2DIMG, a height setting of the visible dish rack 12 and/or an angle between the image capturing device 110 and the dish rack 12. The metadata META can also comprise a time stamp and settings for the image capturing device 110, such as sensitivity (for example an ISO or gain value), focal length (zoom setting), image angle and the like. If the dishwasher 1 (see FIG. 1 or 3) has an additional lighting device 111, 112 (see FIG. 3), the metadata META in particular comprises information relating to an operating state of the lighting devices 111, 112, such as lighting intensity, lighting spectrum and the like.

In a first step the 2D image 2DIMG and metadata META are combined into a latent vector LVEC. This is preferably done using a first neural network 125 (see FIG. 4 or 6). The latent vector LVEC in particular comprises information of relevance or necessary to determine the 3D image 3DIMG. The latent vector LVEC in particular comprises a quantity of data that is maximum 1/100, preferably maximum 1/500, particularly preferably maximum 1/1000, more particularly preferably maximum 1/10,000 of the quantity of data in the captured 2D image 2DIMG. Generation of the latent vector LVEC by a neural network 125 is described in detail with reference to FIG. 4.

In a second step the 3D image 3DIMG is determined on the basis of the latent vector LVEC. This is preferably done using a second neural network 130 (see FIG. 5 or 6), which is configured in particular as a GAN.

Figure 3:
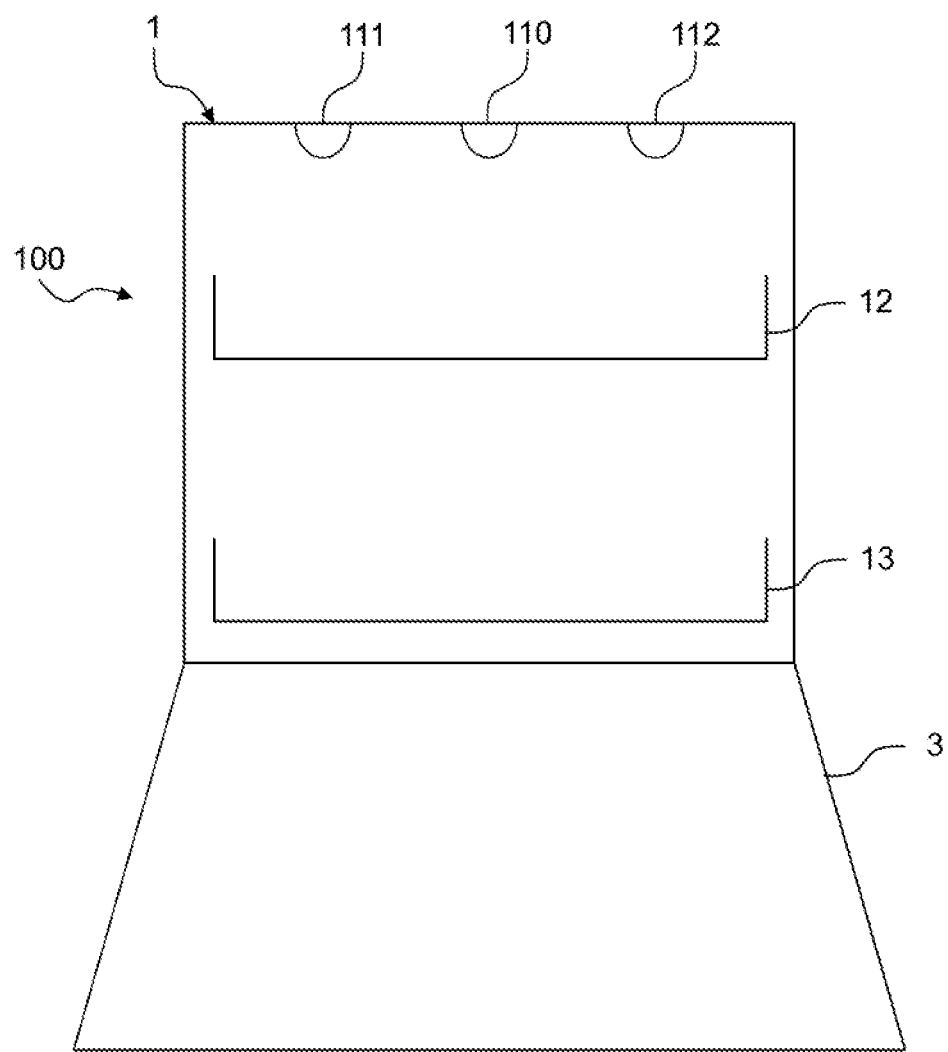
FIG. 3 shows a schematic view of a further embodiment of a household dishwasher.

FIG. 3 shows a schematic view of a further embodiment of a household dishwasher 1. FIG. 3 in particular shows a front view of the household dishwasher 1 with the door 3 opened. The household dishwasher 1 in FIG. 3 can be configured in the same way as the household dishwasher 1 described with reference to FIG. 1 and can have all the features set out there, even if these are not shown in FIG. 3. In addition to the centrally arranged image capturing device 110 the household dishwasher 1 also has two lighting devices 111, 112, which are arranged next to the imaging capturing device 110.

The lighting devices 111, 112 comprise for example a flash device and/or an LED lighting unit. The lighting devices 111, 112 can be configured identically or differently from one another. In some embodiments just one lighting device and/or more than two lighting devices can be provided.

Figure 4:
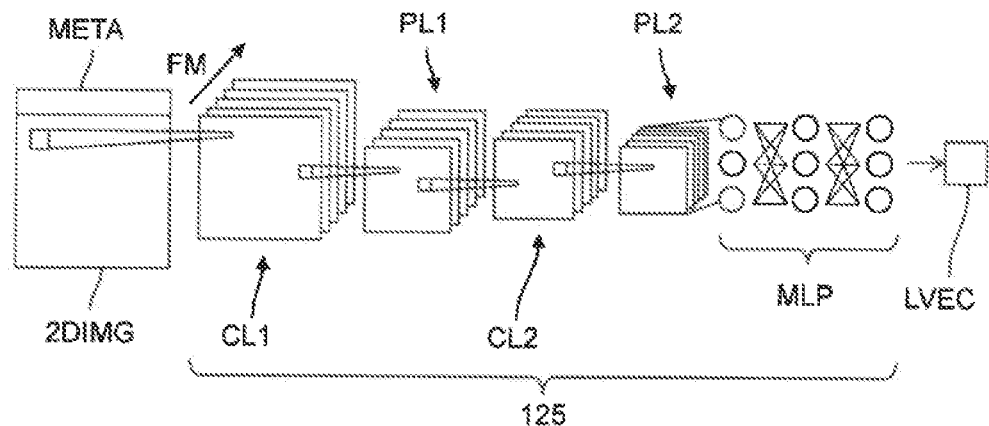
FIG. 4 shows a schematic flow diagram as an example for determining a latent vector.
Figure 5:
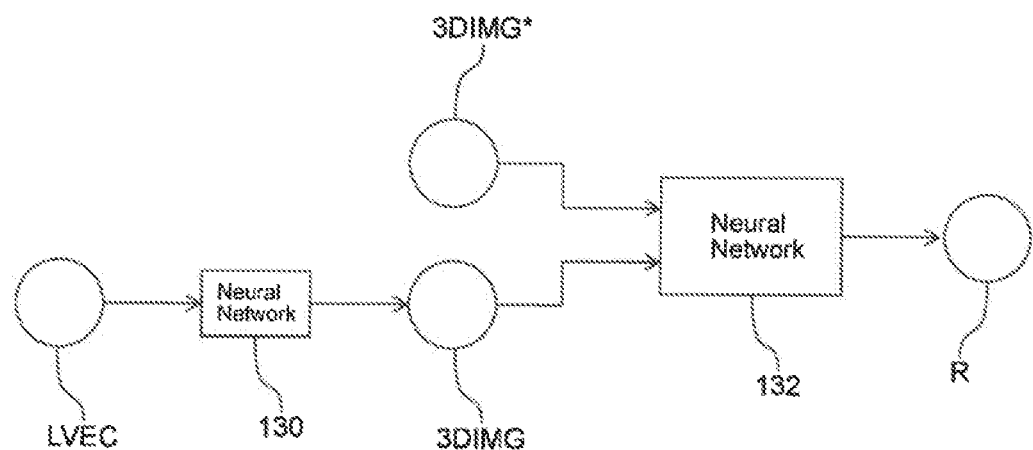
FIG. 5 shows a schematic block diagram of an arrangement for training a neural network.
Figure 6:
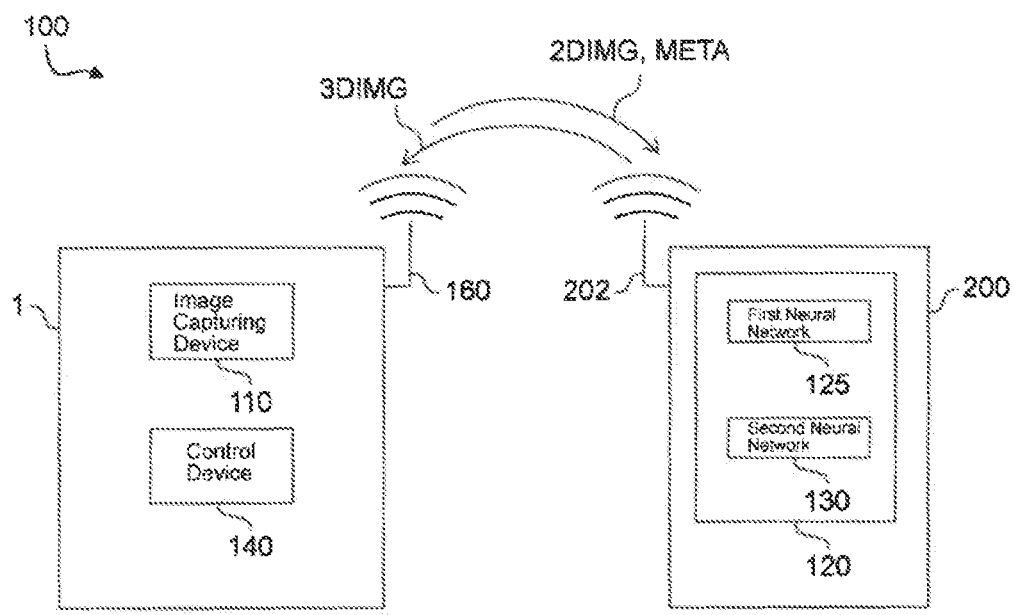
FIG. 6 shows a schematic block diagram of a system with a dishwasher and an external unit.

The lighting devices 111, 112 are designed in particular to illuminate the dish racks 12, 13 when the image capturing device 110 captures a 2D image 2DIMG (see FIG. 2, 4 or 6). The offset arrangement of image capturing device 110 and lighting devices 111, 112 results in particular in a parallax between the image capturing device 110 and the lighting devices 111, 112. This means that the captured 2D image 2DIMG also includes shadowed regions, which can assist the determination of the 3D image 3DIMG (see FIG. 2, 5 or 6). The two lighting devices 111, 112 are preferably designed to illuminate the respective dish rack 12, 13 with different spectra, for example with different colors. The image capturing device 110 then captures in particular a 2D image 2DIMG, which comprises a greater information density with regard to the three-dimensional shape of the dishes 21-25 (see FIG. 2) arranged in the dish rack 12, 13, as there can be shadowed regions from two lighting devices. The metadata META (see FIG. 2) of the captured 2D image 2DIMG comprises in particular information relating to a relative arrangement of the image capturing device 110 and the lighting devices 111, 112 as well as the operating state of a respective lighting device 111, 112 at the time the image was captured.

Provision can be made for the image capturing device 110 to capture multiple 2D images 2DIMG in different operating modes of the lighting devices 111, 112, in particular with different lighting spectra, to capture additional image information relating to the dishes 21-25 arranged in the dish rack 12, 13.

FIG. 4 shows a schematic flow diagram as an example for determining a latent vector LVEC on the basis of a 2D image 2DIMG and associated metadata META. The latent vector LVEC here is generated by a trained neural network 125, which comprises multiple functional layers. In this example these are a first filter layer CL1 (convolutional layer), a first aggregation layer PL1 (pooling layer), a second filter layer CL2, a second aggregation layer PL2 and a multi-layered perceptron MLP.

The two filter layers CL1, CL2 are designed to determine a number of what are referred to as feature maps FM on the basis of the respective input data. A respective filter layer CL1, CL2 comprises in particular multiple filters, each filter generating a feature map FM. The generated feature maps FM correspond in particular to a more compact and abstract representation of the input information. Use of the filter layers CL1, CL2 therefore reduces the quantity of data.

The aggregation layers PL1, PL2 reduce the quantity of data further, in that a respective aggregation layer PL1, PL2 for example only forwards the most relevant information in the input data (for example the feature maps FM of the first filter layer CL1 for the first aggregation layer PL1) (for example in the form of what is referred to as a max pooling layer).

It should be noted that in further embodiments the number and/or sequence of the filter layers CL1, CL2 and aggregation layers PL1, PL2 can differ from those shown in FIG. 4.

The multi-layered perceptron MLP is configured in particular as a fully connected neural network or layer. The multi-layered perceptron MLP generates the latent vector LVEC on the basis of the output data of the second aggregation layer PL2.

FIG. 5 shows a schematic block diagram of an arrangement for training a neural network 130. The neural network 130 is trained for example to generate a 3D image 3DIMG on the basis of a latent vector LVEC, which was generated for example as described with reference to FIG. 4 on the basis of a captured 2D image 2DIMG (see FIG. 2, 4 or 6) and associated metadata META (see FIG. 2, 4 or 6). The neural network 130 can be in particular part of the image processing device 120.

The arrangement in FIG. 5 corresponds in particular to a GAN (generative adversarial network). A GAN is for example an unsupervised learning process, in which two neural networks 130, 132 compete with one another to some degree. Latent vectors LVEC and 3D images 3DIMG* are predefined as the training data. The predefined 3D image 3DIMG* shows the reality here and the corresponding latent vector LVEC is the latent vector LVEC derived on the basis of the corresponding 2D image 2DIMG.

The neural network 130 is also referred to as a generator, as it generates an artificial 3D image 3DIMG. The generated 3D image 3DIMG and the true 3D image 3DIMG* are supplied to the neural network 132. The neural network 132 is also referred to as a discriminator. The discriminator 132 decides which of the two images 3DIMG*, 3DIMG supplied is the true image and outputs a corresponding result R. The generator 130 and discriminator 132 are in a competition situation: the generator 130 tries to generate a 3D image 3DIMG that the discriminator 132 deems to be the true 3D image 3DIMG*. If there is a sufficiently large quantity of training data, the generator 130 is able to generate a 3D image 3DIMG that corresponds to an actual three-dimensional view of the dish rack 12, 13, 14 (see FIG. 1 or 3). The trained generator 130 is for example part of the image processing device 120.

FIG. 6 shows a schematic block diagram of a system 100 with a dishwasher 1 and an external unit 200. The dishwasher 1 is configured in particular as a household dishwasher and can have the features of the household dishwashers 1 described in FIGS. 1 and 3. In this example in particular the household dishwasher 1 has a communication unit 160. The communication unit 160 is designed to establish a communication connection with an external device 200. The communication connection can be established in particular wirelessly, for example using WLAN, Bluetooth and/or a 2G, 3G, 4G and/or 5G mobile radio standard. The communication connection can also be wired.

The external device 200 is configured in particular as a computer or server, which can be accessed by way of the internet. To this end the external device 200 also has a communication unit 202. In this example the image processing device 120 is integrated in the external device 200.

The dishwasher 1 transmits the captured 2D image 2DIMG of the dish rack 12, 13, 14 (see FIG. 1 or 3) and the associated metadata META to the external device 200 by means of the communication unit 160. The external device 200 comprises the image processing device 120, which comprises a first neural network 125, in particular a CNN (convolutional neural network), and a second neural network 130, in particular a GAN. The image processing device determines the 3D image 3DIMG of the dish rack 12, 13, 14 on the basis of the received 2D image 2DIMG and the metadata META and transmits the determined 3D image 3DIMG to the household dishwasher 1.

This can be advantageous as determination of the 3D image 3DIMG as a function of the captured 2D image 2DIMG and the metadata META can be a computing-intensive procedure. In this exemplary embodiment it is not necessary for the dishwasher 1 to provide such computing power itself so it can be configured in a less complex manner. However the presence of the external device 200 does not exclude the dishwasher 1 having an image processing device 120.

It should be noted that the dishwasher 1 in FIG. 6 also features the image processing device 120. This could allow, for example, processing to be carried out locally as required, in other words using the image processing device 120 of the dishwasher 1, or externally, in other words using the image processing device 120 of the external device 200. This can be advantageous, for example if there is a connection problem in respect of the communication connection.

In some embodiments (not shown) the dishwasher 1 comprises for example the first neural network 125 and the external device 200 comprises the second neural network 130. In this case the dishwasher 1 transmits the latent vector LVEC to the external device 200.

In some embodiments (not shown) the dishwasher 1 comprises for example the second neural network 130 and the external device 200 comprises the first neural network 125. In this case the dishwasher 1 receives the latent vector LVEC from the external device 200.

Figure 7:
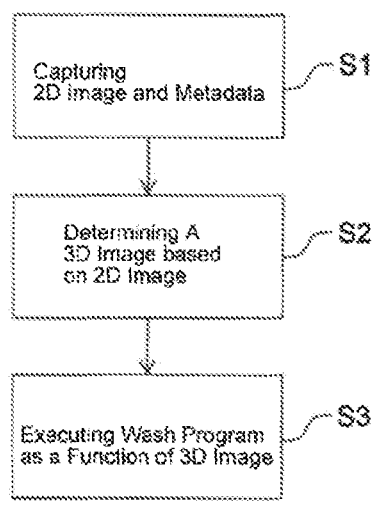
FIG. 7 shows a schematic block diagram of an exemplary embodiment of a method for operating a dishwasher.

FIG. 7 shows a schematic block diagram of an exemplary embodiment of a method for operating a dishwasher 1, for example the household dishwasher in FIG. 1 or FIG. 3.

In a first step S1 a 2D image 2DIMG (see FIG. 2, 4 or 6) of a dish rack 12, 13, 14 (see FIG. 1, 2 or 3) of the dishwasher 1 and dishes 21-25 arranged therein (see FIG. 2) and metadata META (see FIG. 2 or 3) relating to the 2D image 2DIMG are captured.

In a second step S2 a 3D image 3DIMG (see FIG. 2, 5 or 6) of the dish rack 12, 13, 14 is determined on the basis of the captured 2D image 2DIMG and the captured metadata META. This is done for example as described above with reference to FIGS. 2, 4 and 5.

In a third step S3 a wash program is executed as a function of the determined 3D image 3DIMG. It can be determined for example on the basis of the 3D image 3DIMG whether a dish 21-25 is sticking out of the dish rack 12, 13, 14 and may block a spray device, such as a rotatably supported spray arm, and corresponding measures can be implemented. An intensive wash zone can also be activated or deactivated automatically. A user can also be helped to determine an optimal load when loading the dishwasher 1 with dishes 21-25. A drying step can also be optimized.

Although the present invention has been described based on exemplary embodiments, it can be modified in many different ways.

The invention claimed is:

1. A system, comprising:
a dishwasher comprising a dish rack designed to receive dishes;
an image capturing device designed to capture a 2D image of the dish rack of the dishwasher and the dishes;
an image processing device configured to perform operations comprising:
receiving the 2D image of the dish rack;
determining metadata about the 2D image of the dish rack, wherein the metadata comprises a position of the dish rack relative to the image capturing device;
generating, by using the 2D image of the dish rack and the metadata as input to a trained neural network, a latent vector that has less data than a combination of data of the 2D image and the metadata; and
generating, by using the latent vector as input, a 3D image indicating an arrangement of the dishes in the dish rack; and
a control device designed to execute a wash program, wherein a set of parameters of the wash program is controllable as a function of the arrangement of the dishes indicated in the 3D image.

2. The system of claim 1, wherein the dishwasher is a household dishwasher.

3. The system of claim 1, wherein the image processing device comprises a first neural network that is a trained convolutional neural network (CNN), wherein the image processing device further comprises a second neural network that is a trained generative adversarial network (GAN) that is trained to generate 3D images based on input latent vectors, wherein the trained CNN is configured to generate the latent vector using the captured 2D image and the metadata of the captured 2D image as input, and wherein the trained GAN is configured to determine the 3D image of the dish rack using the generated latent vector as input.

4. The system of claim 3, wherein a quantity of data in the latent vector is 1/10,000 of a quantity of data in the captured 2D image and the metadata.

5. The system of claim 3, further comprising a device external to the dishwasher and integrating at least one of the first and second neural networks of the image processing device.

6. The system of claim 1, wherein the metadata of the captured 2D image comprises information relating to the dish rack that is visible on the captured 2D image and/or a segment of the dish rack that is visible on the captured 2D image.

7. The system of claim 1, wherein the metadata of the captured 2D image comprises information relating to a height setting of the dish rack at a time when the 2D image is captured.

8. The system of claim 1, wherein the position of the dish rack relative to the image capturing device comprises information relating to an angle between the image capturing device and the dish rack.

9. The system of claim 1, wherein the dishwasher comprises a lighting device designed to illuminate the dish rack, with the metadata of the 2D image comprising information relating to an operating mode of the lighting device at a time when the 2D image is captured.

10. The system of claim 1, wherein the dishwasher comprises multiple lighting devices arranged spatially separated from one another to illuminate the dish rack, with the metadata of the 2D image comprising information relating to a respective operating mode of the multiple lighting devices at a time when the 2D image is captured.

11. The system of claim 10, wherein the image capturing device is designed to capture multiple 2D images of the dish rack as the multiple lighting devices are in different operating modes, with metadata of the multiple 2D images comprising information relating to the operating modes of the multiple lighting devices at the time when a respective one of the 2D images is captured, said image processing device being designed to determine a 3D image as a function of the multiple 2D images and the metadata, respectively.

12. The system of claim 1, wherein the dishwasher comprises a movably supported spray device, said control device being designed to determine as a function of the 3D image of the dish rack a blocking of the spray device of the dishwasher caused by dishes arranged in the dish rack and to execute the wash program as a function of the determined blocking.

13. The system of claim 1, wherein the control device is designed to determine a mass of the dishes arranged in the dish rack as a function of the 3D image of the dish rack and to execute the wash program as a function of the determined mass.

14. The system of claim 1, wherein the dishwasher comprises a hydraulic system, which comprises at least one intensive wash zone, said control device being designed to selectively activate the at least one intensive wash zone as a function of the 3D image of the dish rack.

15. The system of claim 1, further comprising an external device external to the dishwasher and integrating the image processing device, said dishwasher comprising a communication unit, which is designed to transmit the captured 2D image and the metadata to the external device and to receive the 3D image of the dish rack from the external device.

16. A method for operating a dishwasher, the method comprising:
 capturing a 2D image of a dish rack of the dishwasher and dishes arranged therein;
 determining metadata about the 2D image of the dish rack, wherein the metadata comprises a position of the dish rack relative to an image capturing device positioned on the dishwasher;
 generating, by using the 2D image of the dish rack and the metadata as input to a trained neural network, a latent vector that has less data than a combination of data of the 2D image and the metadata;
 determining, by using the latent vector as input, a 3D image indicating an arrangement of the dishes in the dish rack; and
 executing a wash program, wherein a set of parameters of the wash program are controlled as a function of the arrangement of the dishes indicated in the 3D image.

17. The method of claim 16, wherein the dishwasher is a household dishwasher, and wherein executing the wash program comprises executing the wash program in the household dishwasher.

18. A computer program product for operating a dishwasher, the computer program product comprising a computer program embodied on a non-transitory computer readable medium and comprising commands which when executed by a computer, cause the computer to execute the steps of:
 capturing a 2D image of a dish rack of the dishwasher and dishes arranged therein;
 determining metadata about the 2D image of the dish rack, wherein the metadata comprises a position of the dish rack relative to an image capturing device positioned on the dishwasher;
 generating, by using the 2D image of the dish rack and the metadata as input to a trained neural network, a latent vector that has less data than a combination of data of the 2D image and the metadata;
 determining, by using the latent vector as input, a 3D image indicating an arrangement of the dishes in the dish rack; and
 executing a wash program, wherein a set of parameters of the wash program are controlled as a function of the arrangement of the dishes indicated in the 3D image.

* * * * *